(12) United States Patent
Kanchuk et al.

(10) Patent No.: US 12,057,870 B2
(45) Date of Patent: Aug. 6, 2024

(54) SYSTEMS AND METHODS FOR CAPACITY-BASED DIGITAL PRE-DISTORTION OPTIMIZATION

(71) Applicant: Sequans Communications SA, Colombes (FR)

(72) Inventors: Amir Kanchuk, Petach Tikva (IL); Bertrand Debray, Maisons Laffitte (FR)

(73) Assignee: SEQUANS COMMUNICATIONS SA, Colombes (FR)

( * ) Notice: Subject to any disclaimer, the term of this patent is extended or adjusted under 35 U.S.C. 154(b) by 0 days.

(21) Appl. No.: 17/695,729

(22) Filed: Mar. 15, 2022

(65) Prior Publication Data

US 2023/0299801 A1    Sep. 21, 2023

(51) Int. Cl.
*H04B 1/04*    (2006.01)

(52) U.S. Cl.
CPC ... *H04B 1/0475* (2013.01); *H04B 2001/0425* (2013.01)

(58) Field of Classification Search
CPC .............. H04B 1/0475; H04B 2001/0425
USPC ......................................... 375/296
See application file for complete search history.

(56) References Cited

U.S. PATENT DOCUMENTS

| | | | |
|---|---|---|---|
| 2009/0144009 A1* | 6/2009 | Chesnut | H04L 27/364 702/106 |
| 2011/0064171 A1* | 3/2011 | Huang | H04L 25/03343 375/346 |
| 2018/0262168 A1* | 9/2018 | Dzhigan | H03F 1/3247 |
| 2020/0169841 A1* | 5/2020 | Das | H04W 24/10 |
| 2023/0268942 A1* | 8/2023 | Ghannouchi | H04B 10/00 375/297 |

OTHER PUBLICATIONS

Morgan et al, A Generalized Memory Polynomial Model for Digital Predistortion of RF Power Amplifiers, IEEE Transactions on Signal Processing, vol. 54, No. 10, Oct. 2006.
Pasechnyuk et al., Non-Convex Optimization in Digital Pre-Distortion of the Signal, Moscow University, Huawei Russian Research Centre, 2021.

* cited by examiner

*Primary Examiner* — Kevin M Burd
(74) *Attorney, Agent, or Firm* — One LLP

(57) ABSTRACT

Some embodiments relate to systems and methods for capacity based DPD optimization. An example method of capacity based DPD optimization includes choosing a DPD adaptation stimulus to facilitate a SNR estimation. The example method also includes initializing DPD coefficients based on setting the DPD coefficients to an initial guess. Additionally, the example method includes estimating the SNR and calculating the cost function based on the estimated SNR; The example method also includes numerically optimizing the DPD coefficients and updating the DPD coefficient set based on the numerical optimization.

16 Claims, 7 Drawing Sheets

SYSTEMS AND METHODS FOR CAPACITY-BASED DIGITAL PRE-DISTORTION OPTIMIZATION

TECHNICAL FIELD

The disclosure relates generally to the field of electronic circuits, specifically and not by way of limitation, some embodiments are related to capacity-based digital pre-distortion optimization.

BACKGROUND OF THE INVENTION

The Minimum Mean Square Error (MMSE) is widely used in signal processing problems as a minimization criterion, as it is based on a rather simple closed form formula. In many problems, the MMSE solution is also optimal or near optimal in other senses, e.g., Maximum Likelihood (ML) sense or channel capacity sense, and therefore, in principle, the MMSE solution is used as a first option. Many implementations may rely on the assumption that a backward prediction solution (Digital Pre-Distortion (DPD) placed between the power amplifier (PA) sampled signal and the communication signal) is identical to the MMSE solution. Some variants of the MMSE solution improve the estimation by iterations. However, the MMSE solution has several problems. Consequently, there is a need for other DPD optimizations.

SUMMARY OF THE INVENTION

Provided herein are embodiments of systems for capacity based DPD optimization. Some embodiments relate to a method of capacity based DPD optimization that includes choosing a DPD adaptation stimulus to facilitate a SNR (Signal to Noise Ratio) estimation. The example method also includes initializing DPD coefficients based on setting the DPD coefficients to an initial guess. Additionally, the example method includes estimating the SNR and calculating the cost function based on the estimated SNR; The example method also includes numerically optimizing the DPD coefficients and updating the DPD coefficient set based on the numerical optimization.

BRIEF DESCRIPTION OF THE DRAWINGS

The present invention may be better understood by referring to the following figures. The components in the figures are not necessarily to scale. Emphasis instead being placed upon illustrating the principles of the disclosure. In the figures, reference numerals designate corresponding parts throughout the different views.

Figure 1:
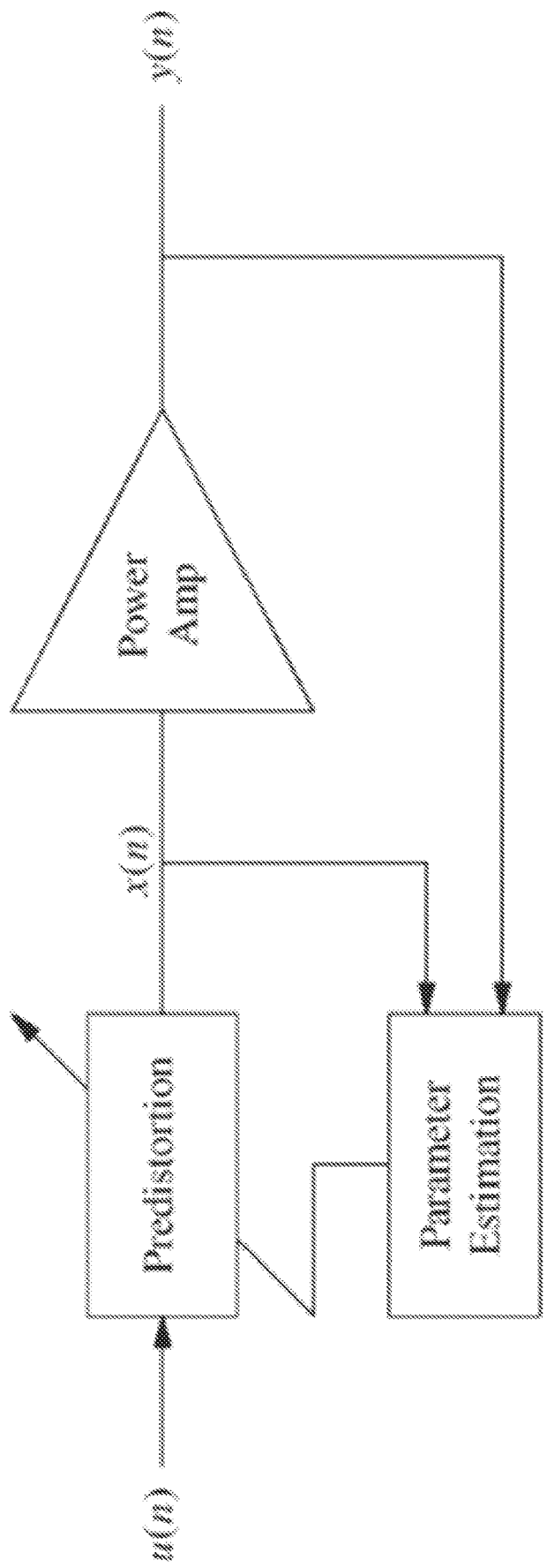
FIG. 1 is a block diagram illustrating a position of the DPD in the transmit chain.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of capacity-based digital pre-distortion optimization will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a block diagram illustrating a position of the Digital Pre-Distortion (DPD) in the transmit chain. DPD is a generic name for a class of algorithms which may improve the linearity of a signal in an electronic circuit subjected to non-linear distortions.

In an example embodiment, the electronic circuit may be active. For example, the electronic circuit may be a Power Amplifier (PA). In another example, the electronic circuit may be passive. For example, the electronic circuit may be a transformer ferrite core. The non-linearities may further be characterized by relations to lag copies and/or lead copies of the signal, in that case termed as "general memory polynomial" or "memory polynomial," dependent whether the lead/lag copies are characterized or not, respectively. The (general) memory polynomial describes time domain dispersion effect that may be found in any band limited device, active or passive.

In an example embodiment, the DPD block (e.g., "Pre-distortion") may precede a non-linear device, (e.g., the PA "Power Amp") and linearizes the output of the PA by correcting the PA's distortion effects, as illustrated in FIG. 1. In modern implementations, the DPD may be implemented in the digital (sampled) domain, and the pre-distorted signal may be fed to a digital-to-analog (D/A) converter, and a radio frequency (RF) transmit chain.

An example embodiment may use DPD to achieve one or more of the following goals:
Increasing the available output power for a given Error Vector Magnitude (EVM)
Decrease the EVM for a given output power
Save power consumption, e.g., by reducing the bias current.

To obtain a meaningful gain, the algorithm's parameters may need to be properly set (e.g., optimized). There may exist several optimization criteria. Some embodiments of the systems and methods described herein may address coefficient solution determination.

A DPD signal processing architecture may take form of several possible implementations. A common form may be based on polynomial pre-distortion of a circuit, such as the Memory Polynomial (MP) or the Generalized Memory Polynomial (GMP) as discussed in "A Generalized Memory Polynomial Model for Digital Predistortion of RF Power Amplifiers," Morgan, et. al, IEEE Trans. SP, 2006, incorporated herein by reference, hereinafter "Morgan." The MP is a subset of the GMP structure, and a memoryless implementation is a subset of an MP. This invention is unrelated to the implementation and/or its complexity.

As previously mentioned, a problem in implementing a DPD is to calculate an optimal set of coefficients in some sense, e.g., MMSE, ML, Capacity etc. In the literature, calculating an optimal set of coefficients is known as finding the "Pre-inverse" of the power amplifier dynamics.

The Minimum Mean Square Error (MMSE) may be widely used in signal processing problems as a minimization criterion, as MMSE is based on a closed form formula. In many problems, the MMSE solution may be optimal or near optimal also in other senses, and therefore, in principle, the MMSE solution may be used as a first option.

Many examples may rely on the assumption that a backward prediction solution (e.g., with a DPD placed between the PA sampled signal and the communication signal) is identical to the MMSE solution. Some variants of the MMSE solution may improve the estimation by iterations. For example, "Obtaining the Pre-Inverse of a Power Amplifier using Iterative Learning Control," M. Schoukens, et al, IEEE Transactions on Microwave Theory and Techniques, 2017.

Figure 2:
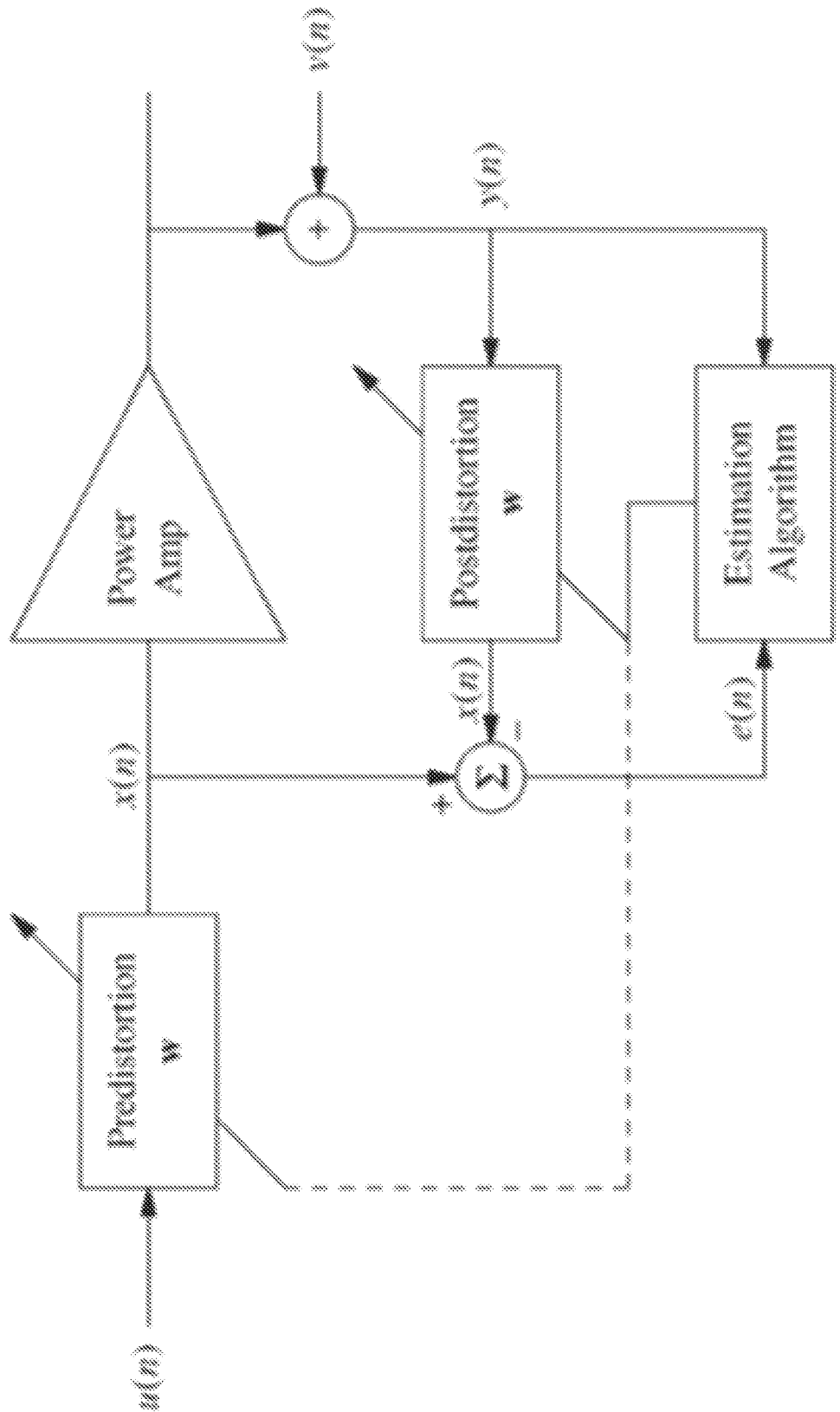
FIG. 2 is a block diagram illustrating a setup for finding the DPD coefficients based on a pre/post assumption.

FIG. 2 is a block diagram illustrating a setup for finding the DPD coefficients based on a pre/post assumption. An example MMSE solution may include the following steps: (FIG. 2)
use a test signal u(n) and set the system to the required configuration, that is, the required output power, BW, carrier frequency and so on. Also, bypass the pre-distortion block.
find a post-distortion coefficient set W such that the mean-square error $E[|e(n)^2|]$ is minimized.
Undo the pre-distortion bypass, and copy the post-distortion set to the pre-distortion set.

The steps above are illustrated in FIG. 2, which is taken from Morgan.

"Non-convex optimization in digital pre-distortion of the signal," D. Pasechnyuk, et al., Moscow Uni., Huawei Russian Research Centre, 2021 illustrates that the post-distortion step may be circumvented, hereinafter Pasechnyuk. Pasechnyuk circumvents the post-distortion step by directly estimating W using a numerical adaptation method. Yet, Pasechnyuk still uses the MMSE as the minimization criterion.

The steps above include two inaccurate assumptions:
First, that the post-distortion coefficient set w is replaceable with the pre-distortion w coefficient set.
This will be true only if the DPD may fully linearize the power amplifier (e.g., such that y(n)=u(n)), which is a bootstrapping assumption FIG. 2 illustrates an example setup for finding the DPD Coefficients based on pre/post Assumption. Although an MMSE criterion may be optimal in many cases, the MMSE criterion is not always optimal for some communication systems problems whose optimality criterion is the channel's capacity.

Detailed Description of an example of the Proposed Methodology

Figure 3:
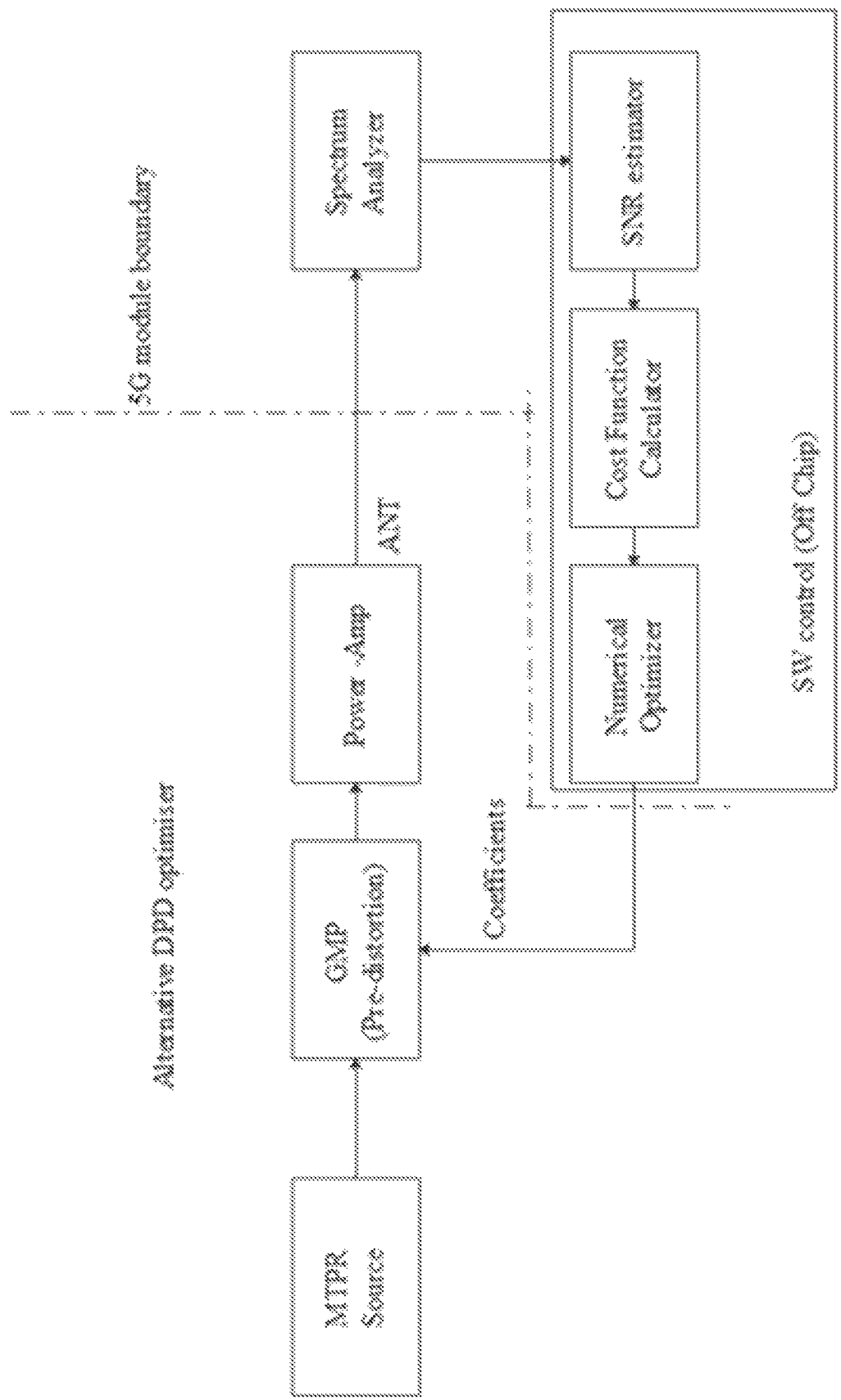
FIG. 3 is a block diagram illustrating an example adaptation embodiment in accordance with the systems and methods described herein.

FIG. 3 is a block diagram illustrating an example adaptation embodiment. In the example adaptation embodiment, the Multi Tone Power Ratio (MTPR) source may feed into the Generalized Memory Polynomial (GMP) predistortion. The GMP may feed into the power amplifier. The MTPR, the GMP, and the power amplifier may form the alternative DPD optimizer. An output of the power amplifier may cross the 5G module boundary and be an input to the spectrum analyzer. The output of the spectrum analyzer may be coupled to software control which may be off chip. The software control may include a signal to noise ratio estimator, a cost function calculator, and a numerical optimizer. The spectrum analyzer may feed the signal to noise ratio estimator. The signal to noise ratio estimator may output a signal to noise ratio estimate to the cost function calculator. The cost function calculator may output a cost function to the numerical optimizer. The numerical optimizer may output coefficients to the GMP.

Figure 4:
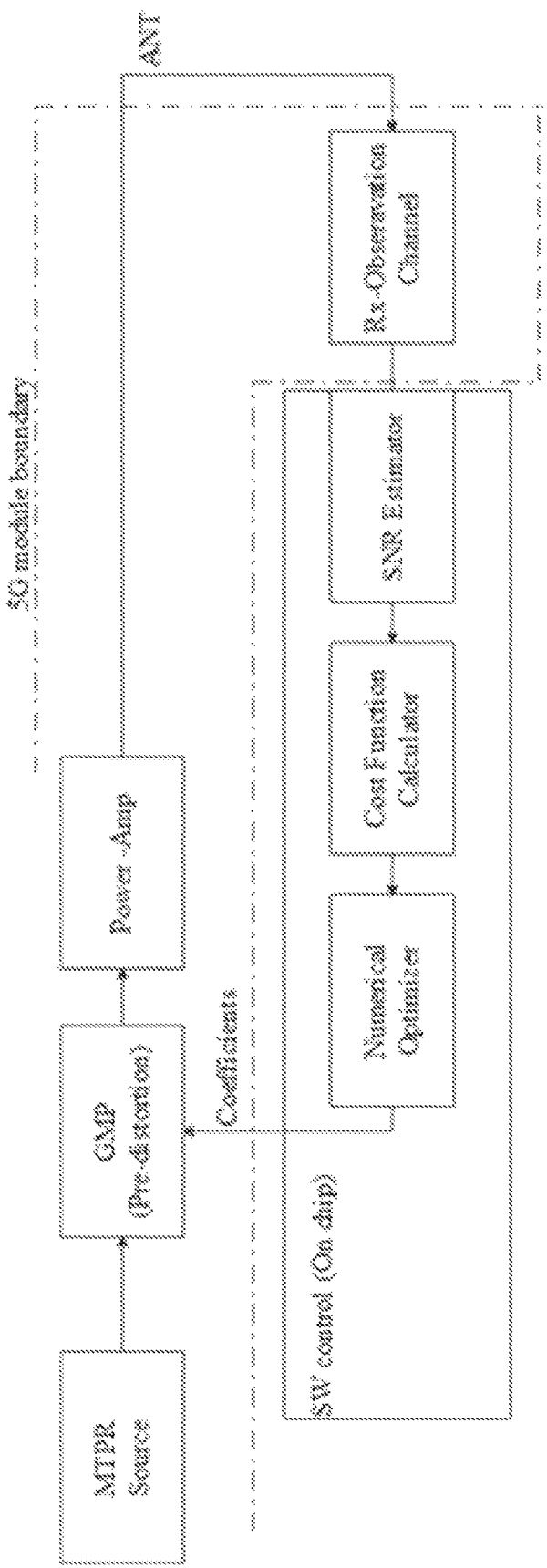
FIG. 4 is a block diagram illustrating an alternative adaptation embodiment using an observation channel in accordance with the systems and methods described herein.

FIG. 4 is a block diagram illustrating an alternative adaptation embodiment using an observation channel. The example of FIG. 4 may generally be similar to the example of FIG. 3. however, the example embodiment of FIG. 4 includes a receive observation channel block between the power amplifier and the signal to noise ratio estimator. As described below, the observation channel replaces the off-chip test equipment.

One example embodiment may deal with DPD training, based on a cost function that depends on estimated SNR. In one example of operation, the cost function may be related to capacity. Also, in the example of operation, the SNR estimation may be based on a missing tone test signal, as described below, (see (MTPR) signal).

Two example embodiments are illustrated in FIGS. 3 and 4. It will be understood, however, that there can be other example linearizing setups. For example, the linearizer may be based on a look up table, or a neural network. FIG. 3 describes a case where the DPD adaptation may be characterized offline by an off-module test equipment. The test equipment's measurements may be used as inputs to the optimization algorithm's cost function. The optimization algorithm's cost function may derive the cost function's value from a manipulation on the SNR estimation. In an example embodiment, the optimization process may be software controlled. In another example embodiment, the optimization process may be hardware controlled. In yet another example embodiment, the optimization process may be controlled by hardware, firmware, software, or some combination of two or more of these.

FIG. 4 describes another case, which may allow for an on-line adaptation, using an on chip dedicated observation channel. The observation channel may replace the off-chip test equipment. Again, the optimization process may be software driven, hardware driven, firmware driven, or some combination of software driven, hardware driven, firmware driven. In one example embodiment, the optimization process may be software driven by, for example, a modem module's software.

In one example embodiment, the DPD adaptation process may follow the steps below:
1) Choose a DPD adaptation stimulus which facilitates SNR estimation. See remark below about the possible stimuli signals.
2) Initialize the DPD coefficients, set to an initial guess and operate the system in the system's standard mode of operation, including output power, bandwidth, carrier frequency and other.
3) SNR estimation. The SNR estimation may be done either externally or internally. For external implementation, standard test equipment may be used. The internal implementation may be done by feeding the signal to the system Rx path, sampling the signal, and estimating the signal's SNR. The SNR estimation may be performed over the entire band or over multiple sub-bands.
4) For the cost function calculation, the cost function may be based on the estimated SNR as described below.
5) A numerical optimizer may run the optimization engine in one step. The numerical optimizer block may be responsible for the DPD coefficients' adaptation process. The numerical optimizer algorithm may be chosen from several methods. Some example solutions include either a gradient search algorithm, of which the BFGS algorithm is the most widely used, or a pattern search algorithm, of which the Simplex down-hill (Nelder-Mead's algorithm) is mostly used. It is noteworthy that due to the noisy property of the cost function, it may be preferable to use the latter algorithm.
6) Update the DPD coefficient set
7) Return to step 3 (SNR estimation).

The stop criterion may be either based on a capacity target or on a limit put on the maximum number of goal function evaluations.

Remark: Test Stimuli. The DPD adaptation stimuli is specified to allow SNR estimation which may be needed for capacity calculation. There may be several (optional, alternative) DPD adaptation Stimuli signals. A list of such stimuli includes, but not limited to:
1. Notched Spectrum, also termed as MTPR (Missing Tone Power Ratio) where the capacity is drawn from observing the inter-modulations leaking into the vacant spectral content.
2. A Communication Standard typical packet, where the capacity will be drawn by the spectral representation of the observed signal's linear model.
3. Other stimuli.

Figure 5:
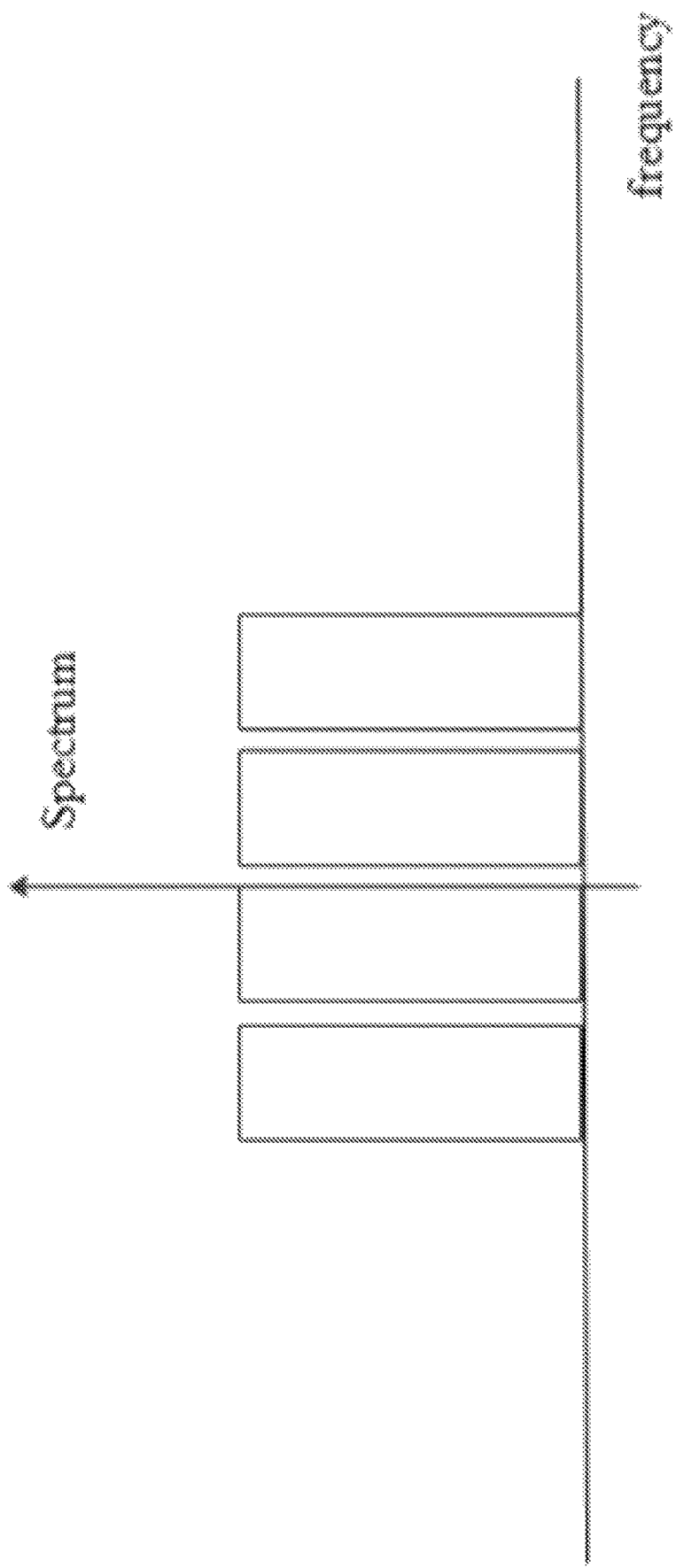
FIG. 5 is a diagram illustrating a spectral representation of an MTPR test signal with the linearity estimated by measuring the "notch-depth" in dB units in accordance with the systems and methods described herein.

FIG. 5 is a diagram illustrating a spectral representation of an MTPR test signal with the linearity estimated by measuring the "notch-depth" in dB units.

MTPR (Multi Tone Power Ratio) Test Signal

The MTPR test signal may be a time-domain-cyclic test signal. The time-domain-cyclic test signal may be a method for estimating a communication channel's SNR. A typical spectral representation is depicted in FIG. 5. It can be observed that the spectrum may be flat except in N (integer) notched parts of the spectrum, as illustrated in FIG. 5. In a realistic scenario, the notched spectral parts may absorb the intermodulation products from the active parts of the spectrum. For a sufficiently long (temporally) test signal, the ratio between the integrated power in the active spectral parts and the notched parts represents the SNR (e.g., as a function of frequency).

In an example embodiment, an advantage of using an MTPR test signal may be that the MTPR test signal may alleviate the need to implement a complicated demodulator which provides the SNR. Additionally, a complicated demodulator may have a substantial latency. Accordingly, the MTPR test signal may alleviate that substantial latency. Furthermore, assuming that the SNR is not sharply changing as a function of frequency, even a small number of notches may be required to form the SNR-frequency relationship, and consequently, obtain a reasonably accurate estimation of the available capacity (e.g., using Shannon's equation). Remark: in one example, the notches may be positioned at equidistant locations in the frequency domain. However, the notches do not necessarily have to be positioned at equidistant locations in the frequency domain.

FIG. 5 illustrates a spectral representation of an MTPR test signal. The linearity may be estimated by measuring the "notch-depth" in dB units.

Forming the Cost Function

The cost function may be based on the Shannon capacity equation. In some embodiments, the cost function may also consider additional inputs, such as MMSE level. The cost function may also include weights over frequency, to give higher weight for selected frequency bands. Furthermore, the cost function may include penalty constraints such as out of band spectral egress, spectral flatness, or other penalty constraints.

Figure 6:
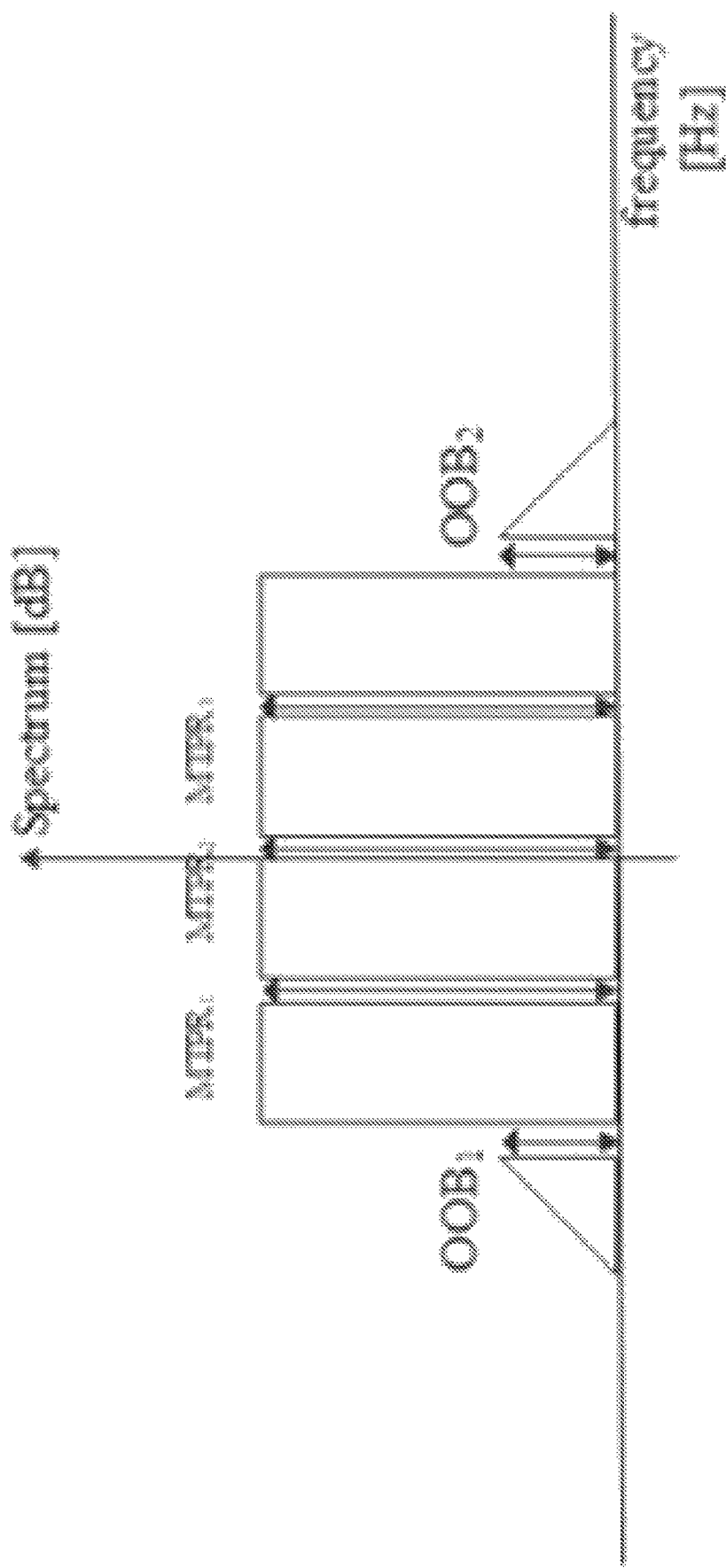
FIG. 6 is a diagram illustrating a method of the cost function in accordance with the systems and methods described herein.

FIG. 6 is a diagram illustrating a method of the cost function. In Equation 1 (EQ. 1), below, C is the cost, $f_1$ is an arbitrarily chosen function, $N_1$ is the quantity of all in-band MTPR measurements, $w_i$ is a weight arbitrarily chosen to emphasize frequencies, $f_2$ is an arbitrarily chosen function, $N_2$ is the quantity of all out of band MTPR measurements, $u_k$ is a weight arbitrarily chosen to emphasize frequencies, and $MTPR_k$ is the Multi Tone Power Ratio (per a specific subcarrier k). The functions $f_{1,f2}$ may add flexibility to the cost function.

In an example embodiment, the cost function may be a weighted sum of:
The average of all N1 MTPR measurements.
The average of the N2 OOB (Out of Band) measurements, where f1 and f2 are arbitrarily chosen functions, usually the identity function, and $w_i$, $U_k$ are weights arbitrarily chosen to emphasize frequencies.

In an embodiment the cost function, C, may be calculated by:

$$C = f_1\left(\frac{1}{N_1}\sum w_i \cdot OOB_i\right) + f_2\left(\frac{1}{N_2}\sum u_k \cdot MTPR_k\right) \qquad \text{EQ. 1}$$

Figure 7:
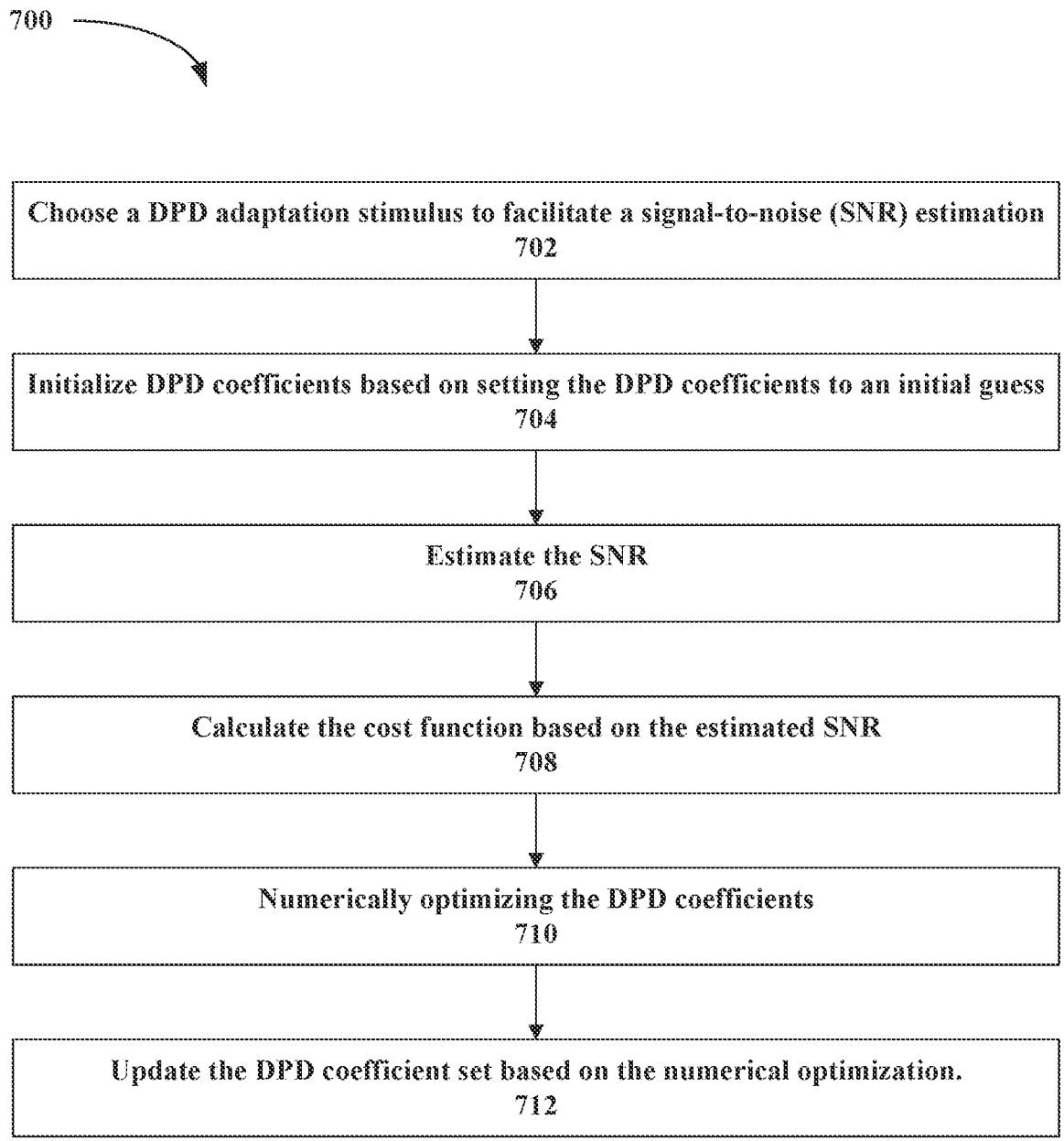
FIG. 7 is a flow diagram illustrating an example method in accordance with the systems and methods described herein.

FIG. 7 is a flow diagram illustrating an example method (700) in accordance with the systems and methods described herein. The method (700) may be a method of capacity based DPD optimization. As illustrated in FIG. 7, the method (700) includes choosing a DPD adaptation stimulus to facilitate a signal-to-noise (SNR) estimation (702). The method (700) also includes initializing DPD coefficients based on setting the DPD coefficients to an initial guess (704). Additionally, the method (700) also includes estimating the SNR (706). The method (700) also includes calculating the cost function based on the estimated SNR (708). Additionally, the method (700) includes numerically optimizing the DPD coefficients (710). The method (700) also includes updating the DPD coefficient set based on the numerical optimization (712).

In an example embodiment, initializing DPD coefficients (704) further includes operating a system in the system's standard mode of operation, including, but not limited to, output power, bandwidth, and carrier frequency. The aforementioned modes of operation may be defined in the device's relevant communication standard documentation, e.g., fifth generation (5 Gnr) References for 5 Gnr standard documentation, may be found e.g., in: https://www.3gpp.org/dynareport/SpecList.htm?release=Re1-15&tech=4

In an example embodiment, estimating the SNR (706) includes an external implementation. In another example embodiment, estimating the SNR (706) includes an internal implementation. The internal implementation may feed a signal to a system receive path, sampling the signal, and estimating the signal's SNR. In an example embodiment, the SNR estimation may be performed over an entire band. In an example embodiment, the SNR estimation may be performed over multiple sub-bands.

In an example embodiment, numerically optimizing the DPD coefficients (710) may include one or more of a gradient search algorithm or a pattern search algorithm.

The words used in this specification to describe the instant embodiments are to be understood not only in the sense of their commonly defined meanings, but to include by special definition in this specification: structure, material or acts beyond the scope of the commonly defined meanings. Thus, if an element can be understood in the context of this specification as including more than one meaning, then its use must be understood as being generic to all possible meanings supported by the specification and by the word or words describing the element.

The definitions of the words or drawing elements described above are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

In the foregoing description and in the figures, like elements are identified with like reference numerals. The use of "e.g.," "etc.," and "or" indicates non-exclusive alternatives without limitation, unless otherwise noted. The use of "including" or "includes" means "including, but not limited to," or "includes, but not limited to," unless otherwise noted.

As used above, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" can refer, in one embodiment, to A only (optionally including entities other than B); in another embodiment, to B only (optionally including entities other than A); in yet another embodiment, to both A and B (optionally including other entities). These entities may refer to elements, actions, structures, processes, operations, values, and the like.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of Digital Pre-Distortion (DPD) performance optimization, the method comprising:
choosing a DPD adaptation stimulus to facilitate frequency domain signal-to-noise (SNR) estimation, wherein the DPD adaptation stimulus is a Multi Tone Power Ratio (MTPR) signal;
initializing DPD coefficients based on setting the DPD coefficients to an initial value;
estimating the SNR over at least two frequencies;
calculating a cost function based on the estimated SNR;
numerically optimizing the DPD coefficients based on the cost function, wherein the cost function is further based on channel capacity; and
updating the DPD coefficient set based on the numerical optimization.

2. The method of claim 1, wherein initializing DPD coefficients further comprises operating a system in the system's standard mode of operation, including at least one of output power, bandwidth, and carrier frequency.

3. The method of claim 1, wherein estimating the SNR comprises an external implementation.

4. The method of claim 1, wherein estimating the SNR comprises an internal implementation.

5. The method of claim 4, wherein the internal implementation feeds a signal to a system receive path, sampling the signal, and estimating the signal's SNR.

6. The method of claim 1, wherein SNR estimation is performed over an entire band.

7. The method of claim 1, wherein SNR estimation is performed over multiple sub-bands.

8. The method of claim 1, wherein numerically optimizing the DPD coefficients comprises one or more of a gradient search algorithm or a pattern search algorithm.

9. The method of claim 1, wherein considers additional inputs, including Minimum Mean Square Error (MMSE) level.

10. The method of claim 1, wherein the cost function takes into consideration additional inputs.

11. The method of claim 10, wherein the additional inputs include MMSE level.

12. The method of claim 1, wherein the cost function includes weights over frequency.

13. The method of claim 12, wherein the weights over frequency give higher weight for selected frequency bands.

14. The method of claim 1, wherein the cost function includes penalty constraints.

15. The method of claim 14, wherein the penalty constraints include at least one of out of band spectral egress, spectral flatness, or other penalty.

16. A method of Digital Pre-Distortion (DPD) performance optimization, the method comprising:
choosing a DPD adaptation stimulus to facilitate frequency domain signal-to-noise (SNR) estimation;
initializing DPD coefficients based on setting the DPD coefficients to an initial value;
estimating the SNR over at least two frequencies;
calculating a cost function based on the estimated SNR;
numerically optimizing the DPD coefficients based on the cost function; and
updating the DPD coefficient set based on the numerical optimization, wherein the cost function is further based on channel capacity.

* * * * *